United States Patent
Reifman

(10) Patent No.: US 12,179,788 B2
(45) Date of Patent: Dec. 31, 2024

(54) SYSTEM AND METHOD FOR ASSESSING DRIVER ALERTNESS BASED ON A BRAKING REQUEST AND FORWARD VEHICLE DISTANCE INFORMATION

(71) Applicant: Bendix Commercial Vehicle Systems LLC, Avon, OH (US)

(72) Inventor: Daniel S. Reifman, Cleveland, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 69 days.

(21) Appl. No.: 18/081,928

(22) Filed: Dec. 15, 2022

(65) Prior Publication Data

US 2024/0199061 A1    Jun. 20, 2024

(51) Int. Cl.
| | | |
|---|---|---|
| *B60W 50/16* | (2020.01) | |
| *B60W 30/095* | (2012.01) | |
| *B60W 40/08* | (2012.01) | |
| *B60W 50/10* | (2012.01) | |
| *B60W 50/14* | (2020.01) | |

(52) U.S. Cl.
CPC ........ *B60W 50/16* (2013.01); *B60W 30/0956* (2013.01); *B60W 40/08* (2013.01); *B60W 50/10* (2013.01); *B60W 2040/0827* (2013.01); *B60W 2050/143* (2013.01); *B60W 2050/146* (2013.01); *B60W 2420/403* (2013.01); *B60W 2420/408* (2024.01); *B60W 2540/18* (2013.01); *B60W 2540/229* (2020.02); *B60W 2554/80* (2020.02); *B60W 2556/45* (2020.02)

(58) Field of Classification Search
CPC .. B60W 50/16; B60W 30/0956; B60W 40/08; B60W 50/10; B60W 2040/0827; B60W 2050/143; B60W 2050/146; B60W 2420/403; B60W 2420/408; B60W 2540/18; B60W 2540/229; B60W 2554/80; B60W 2556/45
See application file for complete search history.

(56) References Cited

U.S. PATENT DOCUMENTS

| | | |
|---|---|---|
| 6,313,749 B1 | 11/2001 | Horne et al. |
| 6,339,369 B1 | 1/2002 | Paranjpe |

(Continued)

FOREIGN PATENT DOCUMENTS

| | | |
|---|---|---|
| JP | H09309358 A | 12/1997 |
| JP | 4710502 B2 | 6/2011 |

OTHER PUBLICATIONS

Appelle, S. et al.; "Simple Reaction Time as a Function of Alertness and Prior Mental Activity"; Perceptual and Motor Skills; 38(3_suppl); Aug. 1974; pp. 1262-1268.

(Continued)

*Primary Examiner* — James J Yang
(74) *Attorney, Agent, or Firm* — Crowell & Moring LLP

(57) ABSTRACT

Driver fatigue can increase a driver's reaction time and result in a collision. A system and method are provided for assessing driver alertness based on a braking request and forward vehicle distance information. Based on the assessed driver alertness, a warning can be issued to the driver to take a break from driving. In one embodiment, the system predicts a time when the driver should take a break based on a curve representing the driver's circadian rhythm.

18 Claims, 4 Drawing Sheets

(56) References Cited

U.S. PATENT DOCUMENTS

| | | |
|---|---|---|
| 8,493,196 B2 | 7/2013 | Pandy |
| 9,390,337 B2 | 7/2016 | Shigemura |
| 9,656,607 B2 | 5/2017 | Stein et al. |
| 2009/0177359 A1 | 7/2009 | Ihara et al. |
| 2010/0125399 A1 | 5/2010 | Grolle |
| 2014/0025270 A1 | 1/2014 | Kosanam et al. |
| 2016/0071393 A1* | 3/2016 | Kaplan .................. A61B 5/162 340/539.12 |
| 2019/0337530 A1* | 11/2019 | Hiramatsu ............ B60W 50/14 |
| 2021/0380115 A1* | 12/2021 | Alpert ...................... G06N 3/02 |

OTHER PUBLICATIONS

Crump, C. et al.; "Driver Reactions in a Vehicle with Collision Warning and Mitigation Technology"; SAE Technical Paper Jan. 1411, 2015; April 14, 2015; 10 pages.

FAQ: Bendix® Wingman® Advanced™—A Collision Mitigation Technology; downloaded from the Intranet on Dec. 2, 2022 at https://www.bendix.com/media/documents/products_1/acb_1/wingmanadvanced/faqbendixwingmanadvanced_generic_0311_final.pdf; Bendix Commercial Vehicle Systems LLC; Mar. 2011; 6 pages.

Collision Avoidance Assist; Tesla Model 3 Owner's Manual; Tesla; 2022; 7 pages.

Van Dongen, PhD, H.P.A. et al.; "Sleep, Circadian Rhythms, and Psychomotor Vigilance"; Clinics in Sports Medicine, 24(2); Apr. 1, 2005; pp. 237-249.

Zhang, Q. et al.; "Driving Fatigue Prediction Model considering Schedule and Circadian Rhythm"; Hindawi Special Issue—Emerging Technologies in Traffic Safety Risk Evaluation, Prevention, and Control; col. 2020, Article ID 9496259; downloaded from the Intranet on Dec. 2, 2022 at https://www.hindawi.com/journals/jat/2020/9496259/; Mar. 19, 2020; 23 pages.

\* cited by examiner

SYSTEM AND METHOD FOR ASSESSING DRIVER ALERTNESS BASED ON A BRAKING REQUEST AND FORWARD VEHICLE DISTANCE INFORMATION

BACKGROUND

Driver fatigue can increase a driver's reaction time to actuate brakes or turn the steering wheel, which can result in a collision. To reduce the risk of traffic accidents caused by fatigue, regulations have been put in place that limit the number of hours that a driver can drive a commercial vehicle, such as a tractor towing a trailer. After the number of hours have been reached, the driver is required to take a break for some period of time before the driver can resume driving.

SUMMARY

The following embodiments relate to a system and method for assessing driver alertness based on a braking request and forward vehicle distance information. In one embodiment, a non-transitory computer-readable storage medium storing computer-readable instructions that, when executed by one or more processors in a vehicle, cause the one or more processors to: receive information from a forward vehicle sensor in the vehicle indicating a distance to a forward vehicle; receive information from a brake actuator in the vehicle indicating a brake request; in response to receiving the information from the forward vehicle sensor and the brake actuator, calculate a time to impact the forward vehicle; compare the calculated time to impact to at least one previously-calculated time to impact; and in response to the calculated time to impact being less than the at least one previously-calculated time to impact, cause a warning to be provided in the vehicle.

In another embodiment, a method is provided that is performed in one or more processors in a vehicle. The method comprises: determining a plurality of values indicative of driver fatigue, wherein each value is based on a distance to a forward vehicle when a braking request is made, wherein the distance is received from a forward vehicle sensor in the vehicle and the braking request is received from a braking actuator in the vehicle; predicting a time of peak drive fatigue based on the plurality of values; and providing a warning to a driver to avoid driving at the time of peak driver fatigue.

In yet another embodiment, a system is provided comprising: means for monitoring a driver's reaction times in requesting braking to avoid a collision with a forward vehicle; and means for issuing a warning to the driver to avoid driving at a time determined based on the monitored reaction times.

Other embodiments are possible, and each of the embodiments can be used alone or together in combination.

DETAILED DESCRIPTION

Figure 1:
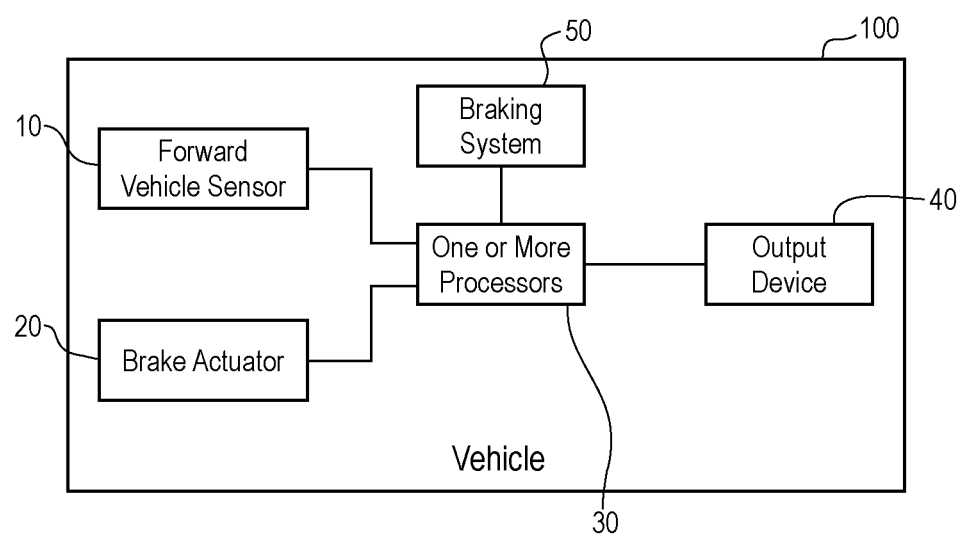
FIG. 1 is a block diagram of a vehicle of an embodiment.

Turning now to the drawings, FIG. 1 is a block diagram of a vehicle 100 of an embodiment. The vehicle 100 can take any form. In one example embodiment, the vehicle is a tractor (truck) that can tow a trailer, while, in other embodiments, the vehicle is an automobile (car). It should be noted that these are merely examples, and other types of vehicle can be used (e.g., motorcycles, pick-up trucks, scooters, etc.). As shown in FIG. 1, in this embodiment, the vehicle 100 comprises a forward vehicle sensor 10, a brake actuator 20 (e.g., a foot brake and/or a hand brake), one or more processors 30, an output device 40, and a braking system 50. The components are in wired or wireless communication with each other. As will be discussed in detail below, these components can be used to monitor and respond to driver alertness/fatigue. Before turning to that discussion, the following paragraphs will describe the components shown in FIG. 1 and example implementations.

Figure 4:
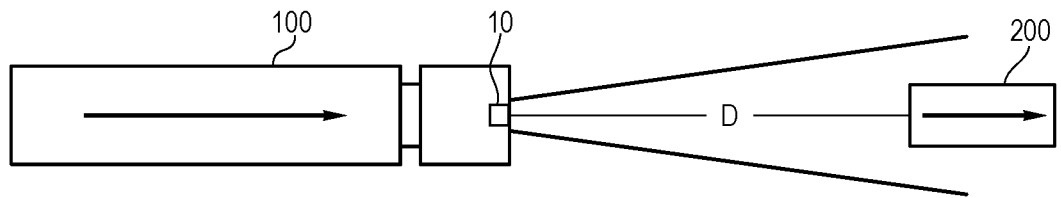
FIG. 4 is an illustration of the operation of a forward vehicle sensor of an embodiment.

The forward vehicle sensor 10 is a sensor that can monitor a distance between the sensor 10 and a "forward vehicle" 200 that is in front of the vehicle 100 (see FIG. 4). By taking multiple distance readings over time, the forward vehicle sensor 10 can also monitor the velocity of the forward vehicle 200 relative to the vehicle 100. The forward vehicle sensor 10 can take any suitable form, such as, but not limited to, a radar-based sensor, a laser-based sensor, and/or a camera-based sensor. The forward vehicle sensor 10 provides electrical signals (e.g., via a wire or wirelessly) to the one or more processors 30 regarding the information that it senses/detects.

The brake actuator 20 (e.g., a foot brake, a hand brake, etc.) provides electrical signals (e.g., via a wire or wirelessly) to the one or more processors 30 indicating that the brake actuator 20 was actuated and/or the degree to which the brake actuator 20 was actuated. In one example implementation, the brake actuator 20 takes the form of a foot brake module that comprises a brake pedal (or other type of actuator) and one or more sensors that measure how much stroke a driver indicates by pressing the brake pedal and transmit electronic signals representing that displacement, which represents a driver brake demand. In one embodiment, the foot brake module contains two sensors, one that increments up and one that increments down as the brake pedal is pressed. These two opposing signals can be used as an error detection mechanism, as the one or more processors 30 can detect an error if the two signals it receives from the foot brake module are not opposing. Also, in one embodiment, the foot brake module generates a signal even when the brake pedal is not pressed (such signal would represent zero braking). That way, if the one or more processors 30 do not receive a signal from the foot brake module, the one or more processors 30 can assume there is a fault or error in the foot brake module or communication channel (which, in one embodiment, is a direct, point-to-point communication channel, such as a universal asynchronous receiver-transmitter (UART) link). It should be understood that any suitable implementation of a foot brake module can be used, and a foot brake module can contain more or different components than those described herein. Also, the brake actuator 20 can take a form other than the example foot brake module discussed in this paragraph.

The output device 40 can take any suitable form, such as, but not limited to, a video display device, an audio output device (e.g., a speaker), a haptic generator, etc.), and any combination thereof. For example, the output device 40 can take the form of a video screen and/or a speaker in the interior of the vehicle 100 (e.g., on or near the dashboard) to alert or notify the driver of the vehicle of various information. As another example, a haptic device (e.g., on the steering wheel, in the driver's seat, on the accelerator and/or brake pedal, etc.) can prove a physical sensation to the driver. The output device 40 can be used for a particular purpose (e.g., for driver alertness) or can be used for multiple purposes (e.g., for driver alertness and also to provide general status information of the vehicle 100).

The one or more processors 30 can execute computer-readable program code having instructions (e.g., modules, routines, sub-routine, programs, applications, etc.) that, when executed by the one or more processors 30, cause the one or more processors 30 to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. The one or more processors 30 can also take the form of a purely-hardware implementation (e.g., an application-specific integrated circuit (ASIC)).

As mentioned above, the one or more processors 30 can be configured to perform a variety of functions. For example, the vehicle 100 in this embodiment employs an electronic braking system (EBS), and the one or more processors 30 can use the electronic braking signals provided by the brake actuator 20 to control the braking system 50 of the vehicle to decelerate/stop the vehicle 100. (The brake actuator 20 can also provide a pneumatic signal to the braking system 50 as a backup to the electronic signal and/or for another purposes). Also, based on the information from the forward vehicle sensor 10, the one or more processors 30 can automatically (e.g., without the driver actuating the brake actuator 20) cause the braking system 50 to apply the brakes, such as to provide adaptive cruise control, collision avoidance, or an electronic stability program (ESP).

Figure 2:
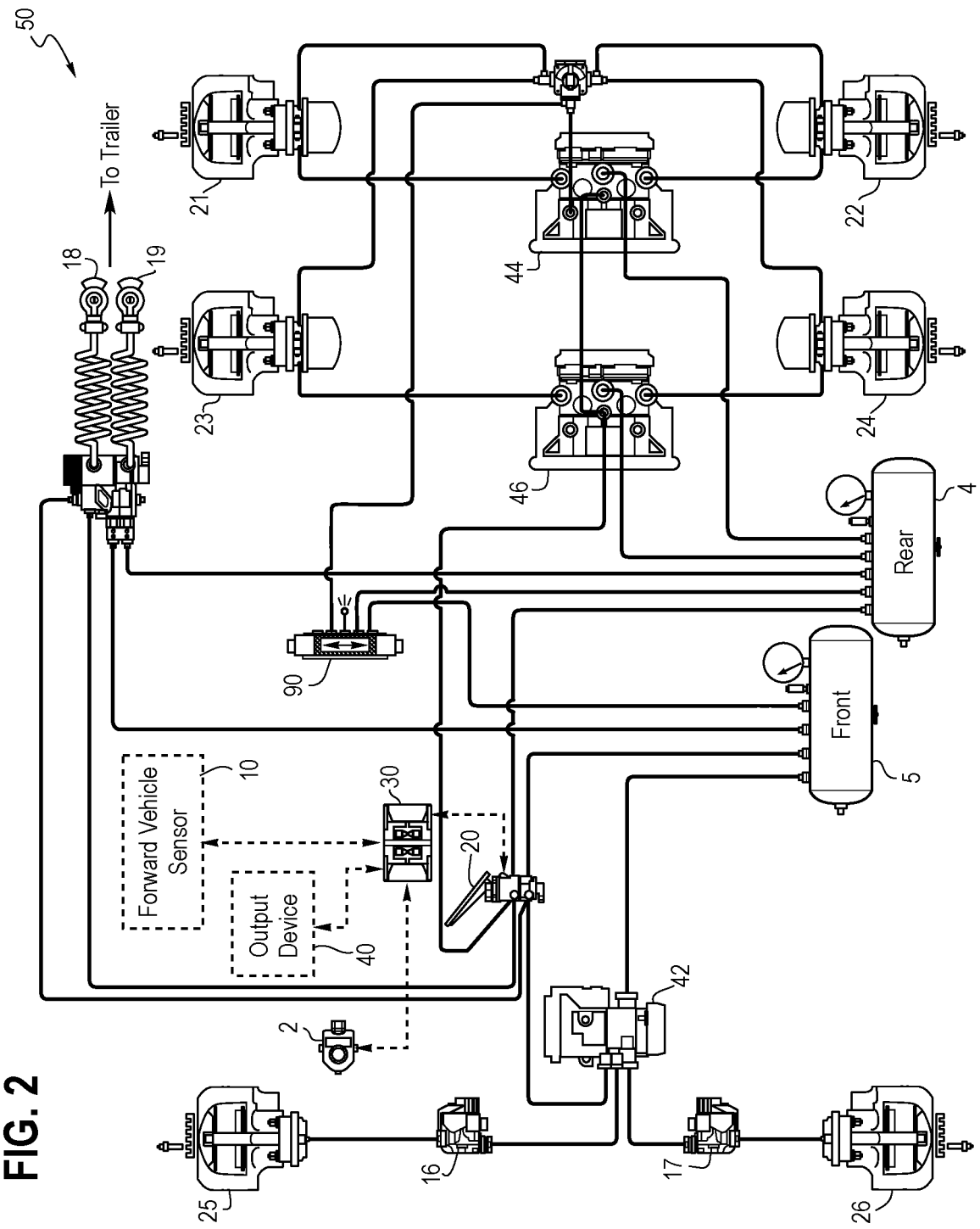
FIG. 2 is an illustration of braking and other components of a vehicle of an embodiment.

Any suitable braking system 50 can be used. FIG. 2 is an illustration of an example braking system 50. It should be understood that this is merely an example and that other/different components can be used. In this example, the vehicle 100 is a tractor that has a rear drive axle, a front undriven (steer) axle (more than one steer axle can be used), and one or more optional axles (there can be zero additional axles, where the vehicle has a total of only two axles). It is important to note that while a tractor is used in this example, these embodiments can also be applied to other vehicles, such as a car. Also, the one or more processors 30 in this example take the form of an "electronic control unit (ECU)" or a "controller," and the brake actuator 20 takes the form of a foot brake module (FBM).

In operation, when the one or more processors 30 receive the electronic brake request signals from the brake actuator 20, the one or more processors 30 maps the signals representing the displacement to a requested deceleration and commands electro-pneumatic modules (EPMs) 42, 44, 46 on the undriven, optional, and driven axles to apply the appropriate amount of pressure needed to achieve that deceleration given various variables, such as, but not limited to, vehicle weight, weight distribution, whether a trailer is present, and driving conditions. In an EBS, relays and modulators on an axle can be combined into an EPM, which is capable of electronically applying, holding, and releasing air to decelerate a wheel end of the axles. The EPMs 42, 44, 46 can cause the vehicle to decelerate in any suitable way. For example, in the embodiment shown in FIG. 2, the EPMs 44, 46 on the drive and optional axle are two-channel EPMs. EPM 44 communicates with friction brakes (here, air disc calipers 21, 22) on each braked wheel end of the steer axle, while EPM 46 communicates air disc calipers 23, 24 on each braked wheel end of the optional axle. The EPM 42 on the undriven axle in this example is a one-channel EPM that communicates, via modulators 16, 17, with air disc calipers 25, 26 on each braked wheel end of the undriven axle. Rear and front reservoirs 4, 5 can provide proportional pneumatic pressure to the EPMs 42, 44, 46. Pneumatic signals for braking can be applied to the trailer via the pneumatic control and supply lines 18, 19. The system also includes a steer-angle sensor 2, which can detect the angle of the steering wheel (e.g., to detect if the vehicle is driving straight or is driving through a curve).

The one or more processors 30 can be configured to provide functionality other than braking. For example, in one embodiment, the one or more processors 30 can use inputs from the forward vehicle sensor 10 and the brake actuator 20 to assess and react to driver alertness/fatigue. This will be discussed in conjunction with the flow chart 300 in FIG. 3. It should be understood that the method illustrated in FIG. 3 is just an example and that the details of this example should not be read into the claims unless expressly recited therein.

Figure 3:
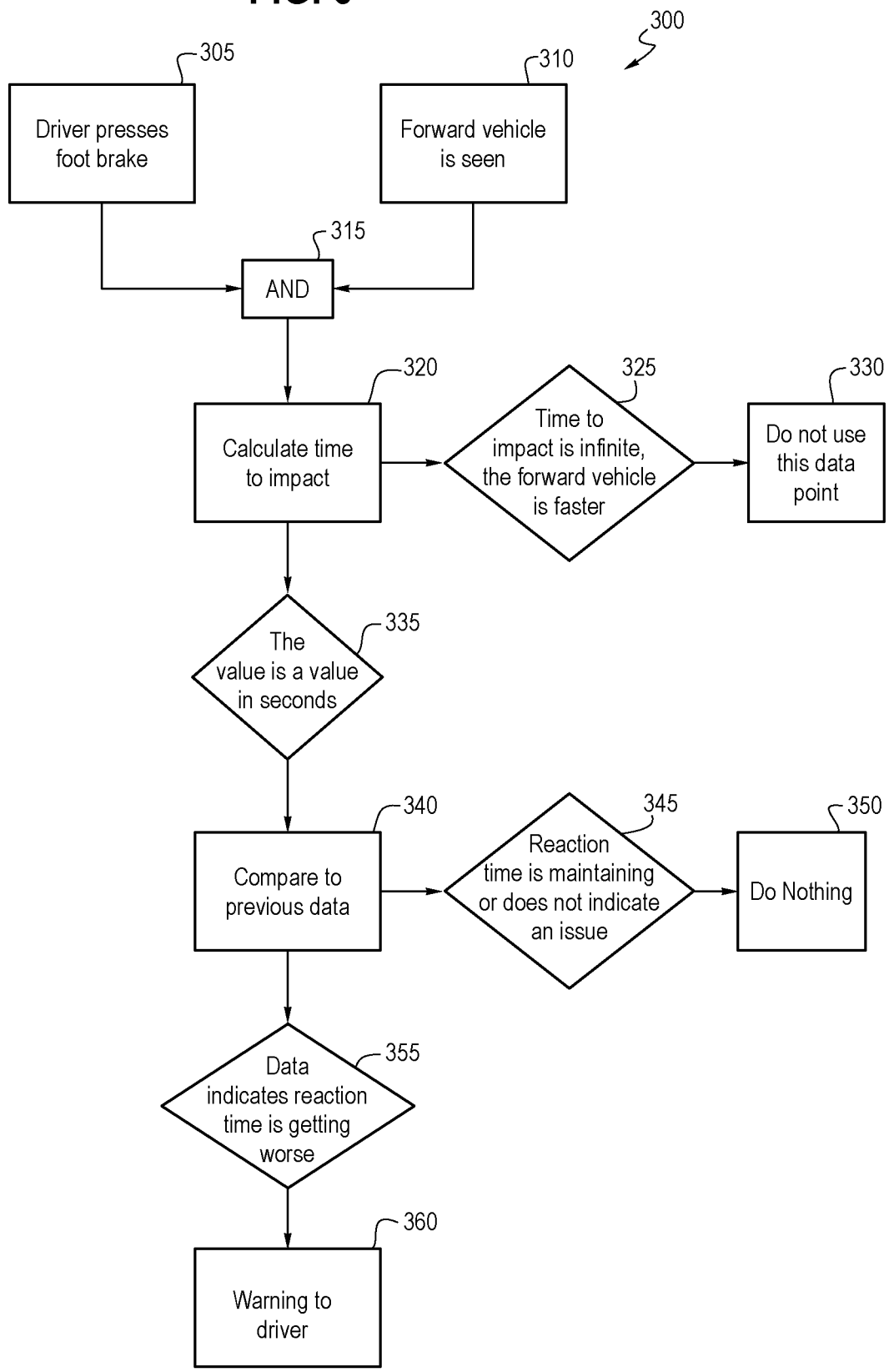
FIG. 3 is a flow chart of a method of an embodiment for assessing driver alertness.

As shown in FIG. 3, the one or more processors 30 receive information from the brake actuator 20 indicating that the brake actuator 20 was actuated (e.g., that the foot brake was pressed, that the hand brake was engaged, etc.) (act 305), which is an indication of a braking request made by the driver of the vehicle 100. The one or more processors 30 also receive information from the forward vehicle sensor 10 indicating that a forward vehicle 200 is present in front of the vehicle 100, as well as a distance (D) to the forward vehicle 200 (act 310) (see FIG. 4). The forward vehicle sensor 10 can provide this information to the one or more processors 30 at some time fixed or variable time interval irrespective of whether a braking request is made, or the information can be provided in response to a braking request being made. Also, the forward vehicle sensor 10 can be configured to not provide forward vehicle information under certain circumstances (e.g., when the steer-angle sensor 2 indicates that the vehicle 100 is not going straight/is going through a curve, which may make the readings from the forward vehicle sensor 10 unreliable). Alternatively, the forward vehicle sensor 10 can provide information without restriction, and the one or more processors 30 can determine whether or not to use that information.

When both the driver braking request and forward vehicle information are present (act 315), the one or more processor 30 calculate a time that the vehicle 100 will impact the forward vehicle 200 given its current trajectory (i.e., the "time to impact the forward vehicle") (act 320). This calculation can be made in any suitable way. For example, the calculation can be based on the speed of the vehicle 100 and the distance to the forward vehicle 200 when the braking request was made, assuming that the forward vehicle sensor 10 is at or near the point of the vehicle 100 that would impact the forward vehicle 100 (or, if not, using the appropriate offset). Multiple readings from the forward vehicle sensor 10 can be made. If the one or more processors 30 determine that the forward vehicle 200 is faster than the vehicle 100 (e.g., because the measured distance (D) is increasing), the time to impact would be infinite (act 325). In this situation, the data point can be discarded in the driver alertness analysis (act 330).

In this example, the time to impact is calculated in seconds (act 335), although other time units (or units other than time) can be used. The one or more processors 30 then compare the calculated time to impact to one or more previously-calculated times to impact the forward vehicle 200 (e.g., for a relevant time period, such as the driver's current driving session) (act 340). It should be noted that the phrase "the forward vehicle" does not necessarily mean the same forward vehicle but generally refers to whatever vehicle is forward of the vehicle 100 when the sensor reading is made. So, "previously-calculated times to impact the forward vehicle" can be refer to times to impact different forward vehicles (e.g., when braking to avoid collisions with several different vehicles over time) and not necessarily to the same forward vehicle.

The calculated time correlates to a driver's alertness/fatigue level, which can be indicative of the driver's reaction time. If the calculated time to impact is greater than or the same as previously-calculated time(s) to impact, no action is taken in this example (act 350) because there is no indication of deterioration of the driver's alertness/reaction time (but if the previously-calculated time(s) were problematic, action can be taken if the calculated time is the same as a previously-calculate time). However, if the calculated time to impact is less than the previously-calculated time(s) to impact, this can indicate that the driver's alertness/reaction time is deteriorating (act 355). As a result, the one or more processors 30 can cause a warning to be outputted via the output device 40 (act 360). As mentioned above, the warning can take any suitable form. For example, the warning can instruct the driver to break (get rest, get caffeine, etc.) immediately or at some future time or simply inform the driver that his alertness is decreasing. The warning can be a visual warning (e.g., a displayed message telling the driver to take a break now or at some time in the future, a warning indicator light, etc.). If the output device 40 is a speaker, the warning can take the form of an audio warning (e.g., a voice message telling the driver to take a break now or in the future, an alarm to stimulate alertness in the driver, etc.). As yet another example, if the output device 40 provides haptic stimulation, the warning can take the form of a haptic warning (e.g., vibration to the steering wheel and/or the driver's seat). These are merely examples, and warnings can come in multiple forms (e.g., a visual message and an audio alert). Also, the warning can be provided immediately after determining that the calculated time to impact is less than the previously-calculated time(s) to impact or at some time after that (both situations being considered "in response to"). Further, the one or more processors 30 can send a report regarding driver alertness (e.g., providing the raw data of calculated times to impact, indicating how many warnings were given or whether the driver took a break in response to the warning, etc.) to an external entity (e.g., the driver's supervisor, insurance carrier, etc.).

As mentioned above, the one or more processors 30 can provide a warning to the driver regarding his alertness in response to a decrease in the driver's reaction time. However, some decreases may not be a cause of concern. So, the one or more processors 30 can be configured to analyze a plurality of time(s) to impact to see if the frequency and/or degree is more than a threshold, in response to which a warning is given immediately or at some time in the future. Even in the situations where a warning is not given immediately after determining that a given calculated time to impact is less than the previously-calculated time(s) to impact, a later warning can still be said to have been given in response to that determination.

In another embodiment, the one or more processors 30 use the calculated times to impact to predict a time when the driver will be fatigued at a certain level (e.g., peak fatigue). This prediction can be made by taking advantage of the fact that a driver's alertness/fatigue level (and, thus, his reaction time) may follow a circadian rhythm, which is a biological process that regulates sleep-wake cycles according to a generally predictable (e.g., sinusoidal) pattern. Taking a break from driving when a driver is predicted to be at or near his peak fatigue level has the advantage of taking the driver off the road during the most-dangerous portions of the circadian cycle. Many factors can affect this cycle, including the amount of sleep prior to driving, driving duration, break duration, etc. Accordingly, it is difficult to know where along the circadian cycle a driver is at any given point in the day. However, the one or more processors 30 can use the calculated times to impact for this purpose, as shown in FIGS. 5 and 6.

Figure 5:
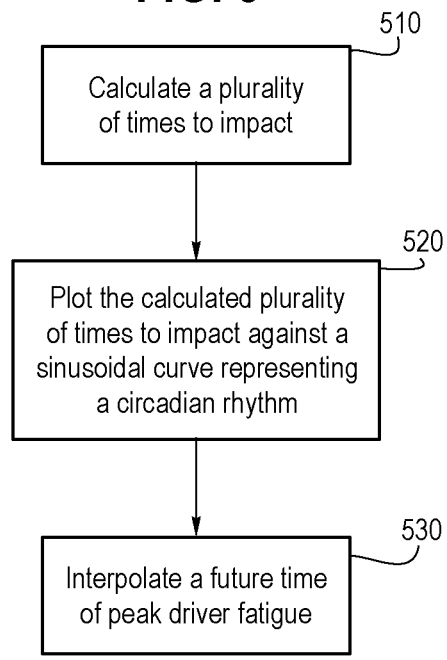
FIG. 5 is a flow chart of a method of an embodiment for predicting a time of peak driver fatigue.
Figure 6:
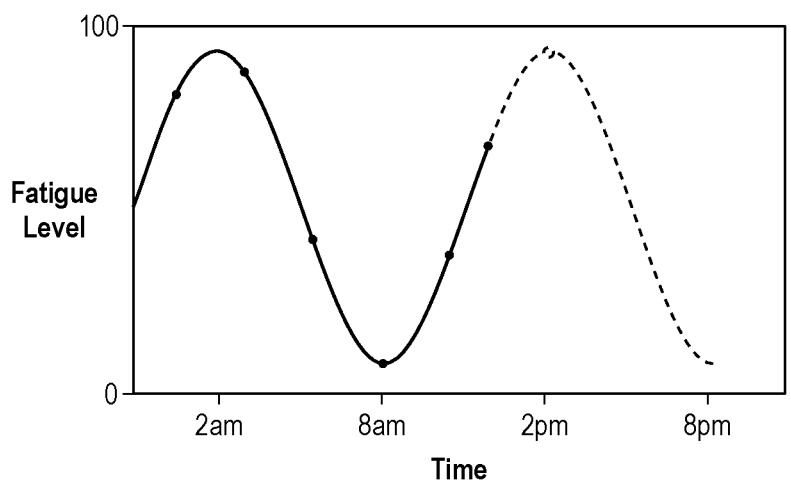
FIG. 6 is a graph of a circadian rhythm that is used in an embodiment to predict a time of peak driver fatigue.

FIG. 5 is a flow chart 500 of a method of an embodiment for predicting times of driver fatigue. As shown in FIG. 5, the one or more processors 30 calculate a plurality of times to impact (e.g., using the method discussed above) (act 510). Next, the one or more processors 30 plot the calculated plurality of times to impact against a sinusoidal curve representing a circadian rhythm (act 510). This is shown in FIG. 6 with various dots plotted along the sinusoidal graph. Next, the one or more processors 30 interpolate a future time of peak driver fatigue (act 520). In the example shown in FIG. 6, the interpolation/best fit/prediction is shown in dotted lines, and the peak driver fatigue occurs around 2 pm. So, at or before 2 pm, the one or more processors 30 can provide a warning to the driver to take a break at or around 2 pm (e.g., for the amount of time specified in the relevant regulations). For example, the one or more processors 30 can provide a warning to the driver indicating that his performance will be at its worst at 2 pm (e.g., in X minutes in a countdown clock) and that he should take a brake around that time. Again, as noted above, the warning can be issued at any time. The one or more processors 30 can also be configured with the ability to verify that the driver took a break at the designated time (e.g., by detecting whether the vehicle was park and for how long it was park at or near the designated time) and take the appropriate reporting action.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A non-transitory computer-readable storage medium storing computer-readable instructions that, when executed by one or more processors in a vehicle, cause the one or more processors to:
   receive information from a forward vehicle sensor in the vehicle indicating a distance to a forward vehicle;
   receive information from a brake actuator in the vehicle indicating a brake request;
   in response to receiving the information from the forward vehicle sensor and the brake actuator, calculate a time to impact the forward vehicle;
   detect an increase in driver fatigue using the calculated time to impact, wherein the increase in driver fatigue is detected by determining that the calculated time to impact is less than at least one previously-calculated time to impact; and
   in response to the detecting the increase in driver fatigue, cause a warning to be provided in the vehicle, wherein the warning indicates that a driver of the vehicle should take a break.

2. The non-transitory computer-readable storage medium of claim 1, wherein the warning indicates a future time when the driver of the vehicle should take the break.

3. The non-transitory computer-readable storage medium of claim 2, wherein the future time is interpolated based on a plurality of calculated times to impact and a curve representing a circadian rhythm.

4. The non-transitory computer-readable storage medium of claim 1, wherein the warning comprises a visual warning.

5. The non-transitory computer-readable storage medium of claim 1, wherein the warning comprises an audible warning.

6. The non-transitory computer-readable storage medium of claim 1, wherein the warning comprises a haptic warning.

7. The non-transitory computer-readable storage medium of claim 1, wherein the forward vehicle sensor comprises a radar.

8. The non-transitory computer-readable storage medium of claim 1, wherein the forward vehicle sensor comprises a laser.

9. The non-transitory computer-readable storage medium of claim 1, wherein the forward vehicle sensor comprises a camera.

10. The non-transitory computer-readable storage medium of claim 1, wherein the brake actuator comprises a foot brake module.

11. The non-transitory computer-readable storage medium of claim 1, wherein the time to impact is calculated in response to receiving steering wheel sensor data indicating that the vehicle is going straight.

12. A method comprising:
    performing in one or more processors in a vehicle:
    calculating a plurality of times of impact, wherein each time of impact is based on a distance to a forward vehicle when a braking request is made, wherein the distance is received from a forward vehicle sensor in the vehicle and the braking request is received from a braking actuator in the vehicle;
    predicting a time of peak driver fatigue based on the plurality of values by:
       plotting the calculated plurality of times to impact against a sinusoidal curve representing a circadian rhythm; and
       interpolating a future time of peak driver fatigue; and
    at or before the predicted time of peak driver fatigue, providing a warning to a driver to avoid driving at the predicted time of peak driver fatigue.

13. The method of claim 12, wherein the warning comprises a visual warning.

14. The method of claim 12, wherein the forward vehicle sensor comprises one or more of the following: a radar, a laser, and a camera.

15. A system comprising:
    means for calculating a plurality of times of impact, wherein each time of impact is based on a distance to a forward vehicle when a braking request is made, wherein the distance is received from a forward vehicle sensor in the vehicle and the braking request is received from a braking actuator in the vehicle;
    means for predicting a time of peak driver fatigue based on the plurality of values by:
       plotting the calculated plurality of times to impact against a sinusoidal curve representing a circadian rhythm; and
       interpolating a future time of peak driver fatigue; and
    means for, at or before the predicted time of peak driver fatigue, providing a warning to a driver to avoid driving at the predicted time of peak driver fatigue.

16. The non-transitory computer-readable storage medium of claim 1, wherein the computer-readable instructions, when executed by the one or more processors in the vehicle, further cause the one or more processors to:
    determine whether the driver of the vehicle took the break by determining whether the vehicle was parked for an amount of time; and
    in response to determining that the driver of the vehicle did not take the break, send a report to an external entity indicating that the driver did not take the break.

17. The method of claim 12, further comprising:
    determining whether the driver avoided driving at the predicted time of peak driver fatigue for a specified amount of time by detecting whether the vehicle was parked at the predicted time of peak driver fatigue for the specified amount of time; and
    sending a report to an external entity in response to determining that the driver of the vehicle did not avoid driving at the predicted time of peak driver fatigue for the specified amount of time.

18. The method of claim 12, wherein the warning comprises an audible warning.

* * * * *